United States Patent
Chu et al.

(10) Patent No.: US 7,970,962 B2
(45) Date of Patent: Jun. 28, 2011

(54) METHOD AND APPARATUS UTILIZING A TAIL BUS TO SOLVE BACK-TO-BACK DATA BURST PROBLEMS

(75) Inventors: Ngok Ying Chu, San Jose, CA (US); John M. Chiang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1430 days.

(21) Appl. No.: 10/269,989

(22) Filed: Oct. 15, 2002

(65) Prior Publication Data

US 2003/0174736 A1 Sep. 18, 2003

Related U.S. Application Data

(60) Provisional application No. 60/364,050, filed on Mar. 15, 2002.

(51) Int. Cl.
| | |
|---|---|
| G06F 13/00 | (2006.01) |
| G06F 13/12 | (2006.01) |
| G06F 15/173 | (2006.01) |
| G06F 15/16 | (2006.01) |
| G01R 31/08 | (2006.01) |
| H04B 7/216 | (2006.01) |
| H04L 12/28 | (2006.01) |
| H04J 3/16 | (2006.01) |
| G10H 7/04 | (2006.01) |
| G10H 1/00 | (2006.01) |

(52) U.S. Cl. ............... 710/34; 710/33; 710/35; 710/72; 370/234; 370/335; 370/389; 370/395.1; 370/400; 370/471; 709/226; 709/250; 84/605; 84/606

(58) Field of Classification Search ........................ None
See application file for complete search history.

(56) References Cited

U.S. PATENT DOCUMENTS

| 5,111,454 A * | 5/1992 | Hung et al. ............... 370/337 |
| 5,228,026 A * | 7/1993 | Albrow et al. ............. 370/280 |
| 5,287,353 A * | 2/1994 | Buda et al. ................ 370/476 |
| 5,418,321 A * | 5/1995 | Keller et al. ................ 84/606 |
| 5,706,439 A * | 1/1998 | Parker ..................... 370/234 |
| 5,816,921 A * | 10/1998 | Hosokawa ................. 463/43 |
| 5,905,725 A * | 5/1999 | Sindhu et al. ............... 370/389 |
| 5,905,756 A * | 5/1999 | Lamkin et al. ............. 375/222 |
| 5,944,843 A * | 8/1999 | Sharma et al. ............. 714/701 |
| 6,094,692 A * | 7/2000 | Kalkunte ................... 710/34 |
| 6,108,152 A * | 8/2000 | Du et al. ..................... 360/51 |
| 6,308,257 B1 * | 10/2001 | Theogarajan et al. ......... 712/210 |
| 6,338,105 B1 * | 1/2002 | Niizuma et al. ............ 710/72 |

(Continued)

OTHER PUBLICATIONS

Richard Cam and Russ Tuck, "System Packet Interface Level 4 (SPI-4) Phase-2: OC-192 System Interface for Physical and Link Layer Devices," Implementation Agreement: OIF-SPI4-02.0, Optical Internetworking Forum, Jan. 2001, pp. 1-64.

Primary Examiner — Tariq Hafiz
Assistant Examiner — Henry Yu

(57) ABSTRACT

A network device includes a port and a bus transmission calculation module. The port is connected to the network device to receive a data burst. The bus transmission calculation module connects to the port for calculating a first number of bytes to be transmitted from a first bus and a second number of bytes to be transmitted from a second bus. The first and second bus connect to the network device and transfer data from the network device.

21 Claims, 11 Drawing Sheets

U.S. PATENT DOCUMENTS

| | | | |
|---|---|---|---|
| 6,493,847 B1 * | 12/2002 | Sorgi et al. | 714/800 |
| 6,510,182 B1 * | 1/2003 | Lee et al. | 375/259 |
| 6,597,699 B1 * | 7/2003 | Ayres | 370/400 |
| 6,654,389 B1 * | 11/2003 | Brunheroto et al. | 370/535 |
| 6,850,508 B1 * | 2/2005 | Chang et al. | 370/335 |
| 6,982,989 B2 * | 1/2006 | Park et al. | 370/471 |
| 7,031,342 B2 * | 4/2006 | Teng | 370/469 |
| 7,103,063 B2 * | 9/2006 | Fang | 370/452 |
| 7,221,645 B2 * | 5/2007 | Wang et al. | 370/203 |
| 2003/0007722 A1 * | 1/2003 | Caroli et al. | 385/24 |
| 2003/0026251 A1 * | 2/2003 | Morris et al. | 370/389 |
| 2003/0074449 A1 * | 4/2003 | Smith et al. | 709/226 |
| 2003/0076832 A1 * | 4/2003 | Ni | 370/395.1 |
| 2003/0123456 A1 * | 7/2003 | Denz et al. | 370/400 |
| 2003/0126297 A1 * | 7/2003 | Olarig et al. | 709/250 |

* cited by examiner

| Bit Position | Label | Description |
|---|---|---|
| 15 | Type | Control Word Type.<br><br>Set to either of the following values:<br>1: payload control word (payload transfer will immediately follow the control word).<br>0: idle or training control word (otherwise). |
| 14:13 | EOPS | End-of-Packet (EOP) Status.<br><br>Set to the following values below according to the status of the immediately preceding payload transfer.<br><br>0 0: Not an EOP.<br>0 1: EOP Abort (application-specific error condition).<br>1 0: EOP Normal termination, 2 bytes valid.<br>1 1: EOP Normal termination, 1 byte valid.<br><br>EOPS is valid in the first control word following a burst transfer. It is ignored and set to "0 0" otherwise. |
| 12 | SOP | Start-of-Packet<br><br>Set to 1 if the payload transfer immediately following the control word corresponds to the start of a packet. Set to 0 otherwise.<br><br>Set to 0 in all idle and training control words |
| 11:4 | ADR | Port Address.<br><br>8-bit port address of the payload data transfer immediately following the control word. None of the addresses are reserved (all are available for payload transfer).<br>Set all to zeroes in all idle control words.<br>Set all to ones in all training control words. |
| 3:0 | DIP-4 | 4-bit Diagonal Interleaved Parity.<br><br>4-bit odd parity computed over the current control word and the immediately preceding data words (if any) following the last control word. |

FIG. 6A

|   | Bit [15:12] | Next Word Status | Prior Word Status | Meaning |
|---|---|---|---|---|
| 0 | 0000 | Idle | Continued | Idle, not EOP, training control word |
| 1 | 0001 | Reserved | Reserved | Reserved |
| 2 | 0010 | Idle | EOP w/abort | Idle, Abort last packet |
| 3 | 0011 | Reserved | Reserved | Reserved |
| 4 | 0100 | Idle | EOP w/2 bytes | Idle, EOP with 2 bytes valid |
| 5 | 0101 | Reserved | Reserved | Reserved |
| 6 | 0110 | Valid | EOP w/1 byte | Idle, EOP with 1 byte valid |
| 7 | 0111 | Reserved | Reserved | Reserved |
| 8 | 1000 | Valid | None | Valid, no SOP, no EOP |
| 9 | 1001 | Valid/SOP | None | Valid, SOP, no EOP |
| A | 1010 | Valid | EOP w/abort | Valid, no SOP, abort |
| B | 1011 | Valid/SOP | EOP w/abort | Valid, SOP, abort |
| C | 1100 | Valid | EOP w/2 bytes | Valid, no SOP, EOP with 2 bytes valid |
| D | 1101 | Valid | EOP w/2 bytes | Valid, SOP, EOP by 2 bytes valid |
| E | 1110 | Valid | EOP w/1 byte | Valid, no SOP, EOP with 1 byte valid |
| F | 1111 | Valid | EOP w/1 byte | Valid, SOP, EOP with 1 byte valid |

FIG. 6B

| Control Word | Description |
|---|---|
| 0110 00000000 abcd | Idle control word following end of transfer. End-of-packet, normal termination, 1 byte valid in last data word. (Note: abcd bits depend on contents of this control word and preceding transfer.) |
| 0000 00000000 1111 | Idle control word preceded by another (idle) control word. |
| 1101 00000101 abcd | Payload control word following end of transfer. End-of-packet, normal termination, 2 bytes valid in last data word of preceding transfer (abcd bits depend on contents of this control word and preceding transfer). |

METHOD AND APPARATUS UTILIZING A TAIL BUS TO SOLVE BACK-TO-BACK DATA BURST PROBLEMS

REFERENCE TO RELATED APPLICATION

This application claims priority of U.S. Provisional Patent Application Ser. No. 60/364,050, which was filed on Mar. 15, 2002. The subject matter of the earlier filed application is hereby incorporated by reference.

BACKGROUND OF THE INVENTION

1. Field of the Invention

This invention relates to a method and apparatus for utilizing a tail bus to solve back-to-back data burst problems, such as loss of bandwidth and transmission delays.

2. Description of the Related Art

In recent years, the unprecedented demands for faster operating electronic devices have placed a greater demand on the operating components of current electronic devices. Unfortunately, some slower devices, which interface with the current state-of-the-art electronic devices, cannot operate at the same transfer rate. As a result of the speed mismatch, a timing difference between the interfaces of two such electronic devices may develop. This timing difference between the logic designs of the faster operating devices and the slower devices may cause a loss of bandwidth or a transmission delay when data burst having variable packet lengths are transmitted between two network devices.

Accordingly, new and improved systems and methods for mitigating bandwidth loss and transmission delays when variable length packets are transmitted between two network devices are needed.

SUMMARY OF THE INVENTION

According to an embodiment of the invention, provided is a network device, which includes a port and a bus transmission calculation module. The port is connected to the network device to receive a data burst. The bus transmission calculation module connects to the port for calculating a first number of bytes to be transmitted from a first bus and a second number of bytes to be transmitted from a second bus. The first and second bus connect to the network device and transfer data from the network device.

According to another embodiment of the invention, provided is a method of data transmission. The method includes the step of receiving a packet at a port connected to a network device. The method also includes the step of calculating a first number of bytes to be transmitted from a first bus connected to said network device; and calculating a second number of bytes to be transmitted from a second bus connected to said network device.

According to an embodiment of the invention, provided is a network device, which includes a port and a bus transmission calculation means. The port is connected to the network device to receive a data burst. The bus transmission calculation module connects to the port for calculating a first number of bytes to be transmitted from a first bus and a second number of bytes to be transmitted from a second bus. The first and second bus connect to the network device and transfer data from the network device.

BRIEF DESCRIPTION OF THE DRAWINGS

The objects and features of the invention will be more readily understood with reference to the following description and the attached drawings, wherein:

FIGS. 6A-6C illustrate examples of control words that may be inserted within a data stream according to an embodiment of the invention;

DETAILED DESCRIPTION OF THE PREFERRED EMBODIMENTS

The invention is directed to a method and apparatus for utilizing a tail bus to solve problems associated with back-to-back data bursts, which may include variable length packets.

Figure 1:
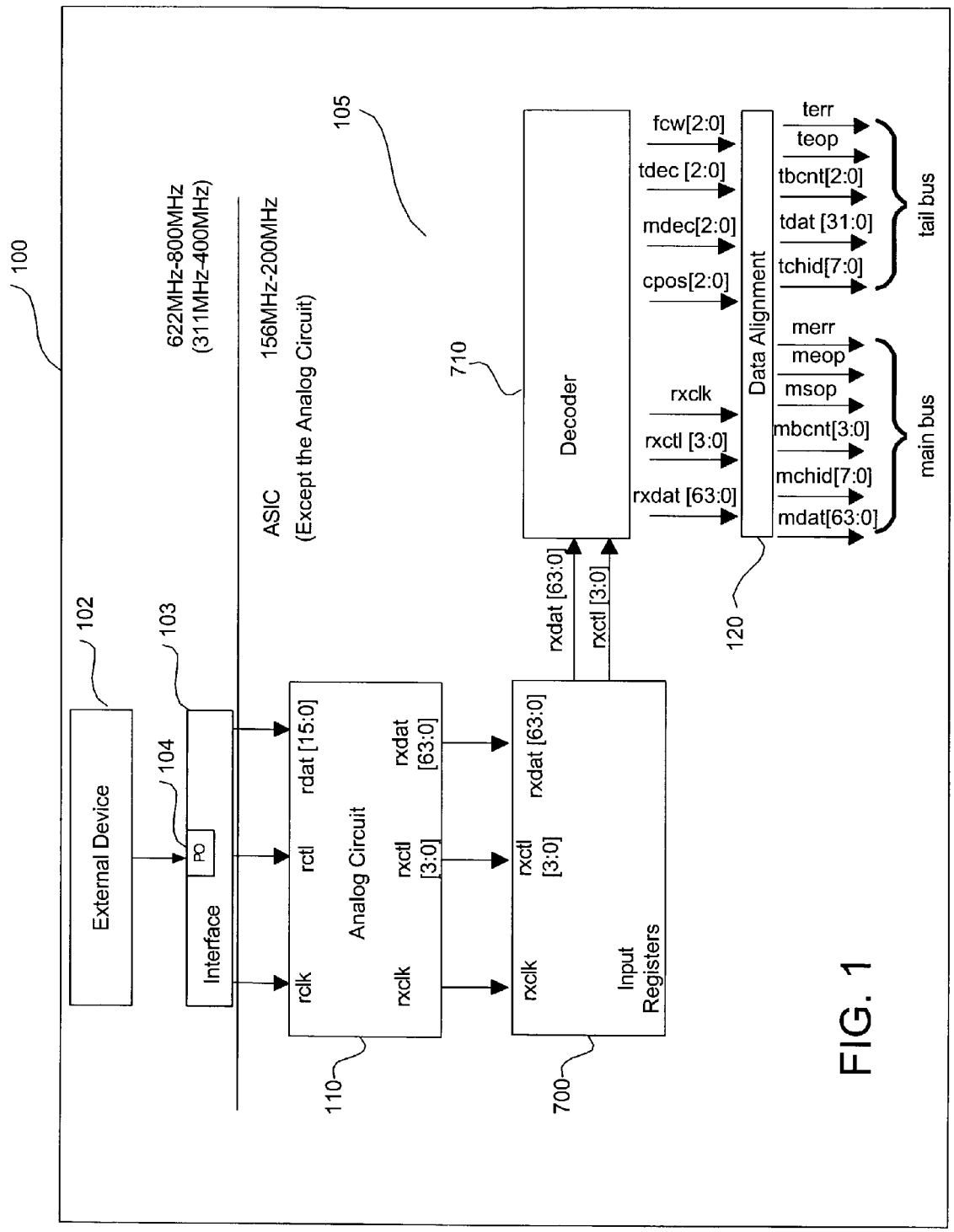
FIG. 1 is a block diagram of a network device according to an embodiment of the invention.

As discussed above, in electronic devices, which connect to other devices, there are many chips that may operate at different clock speeds. For example, an external clock speed of an interface 103 may operate at two times, three times or four times the speed of an internal clock speed to which the interface 103 connects to and communicates with. For instance, as shown in FIG. 1, system 100 may include an interface 103 between an external device 102 and an internal device 105, which may be a SPI-4 (System Packet Interface Level 4 Phase 2: OC-192 System Interface for Physical and Link Layer Devices) interface. SPI-4 may be an interface for packet and cell transfer between a physical layer (PHY) device and a link layer device, for aggregate bandwidths of OC-192 ATM and Packet over SONET/SDH (POS), as well as 10 Gb/s Ethernet applications. The SPI-4 interface may operate at a speed ranging from 622 MHz to 800 MHz. Thus, the clock rate may be half of the data rate (311 MHz -400 MHz) as shown in FIG. 1. However, the clock speed within internal device 105 may not be able to achieve the clock speed of the external device. The components of internal device 105 may be an ASIC (Application-Specific Integrated Circuit). Therefore, a circuit designer may increase the width of the internal data bus, which serves as a common pathway or channel within between the components of the internal device, to compensate for the clock speed. According to the embodiment as shown in FIG. 1, the internal bus width may be expanded to be four times the width of the external bus size.

The system 100 may include at least one port 104 (P0), which may be a well know PHY or transceiver and perform Ethernet layer one functions. Port 104 may be configured to receive and send data packets, and port 104 may be connected to interface 103. The incoming data packets may be transmitted from external device 102 to interface 103. As the data packets travel through interface 103 as a differential signal that may be subjected to signal processing to produce signals such as RCKL, RCTL, and RDAT, as shown in FIG. 1.

As shown in FIG. 1, the invention provides a method and apparatus so that external device 102 may interface with the internal device 105 so that both devices are capable of operating in a synchronized and coordinated manner. To achieve this interoperability between the external and internal device, internal device 105 may include an analog circuit 110 to synchronize the internal and external device.

FIG. 1 depicts the interface signals on the receiving side of internal device 105. The receive data paths for internal device 105 may include a clock signal (RCLK), a control signal (RCTL) and a data signal (RDAT). RCLK may be a clock signal associated with transmitting data signals and control signals between a PHY device and a link layer device. The data and control lines may be driven off the rising and falling edges of the clock signal. RDAT may carry the payload data and the control word from the PHY to the link layer device. In mapping the incoming signals, RCTL may be configured so that it is to a high position when a control word is present in RDAT. Otherwise, RCTL may be set to a low position.

Figure 2:
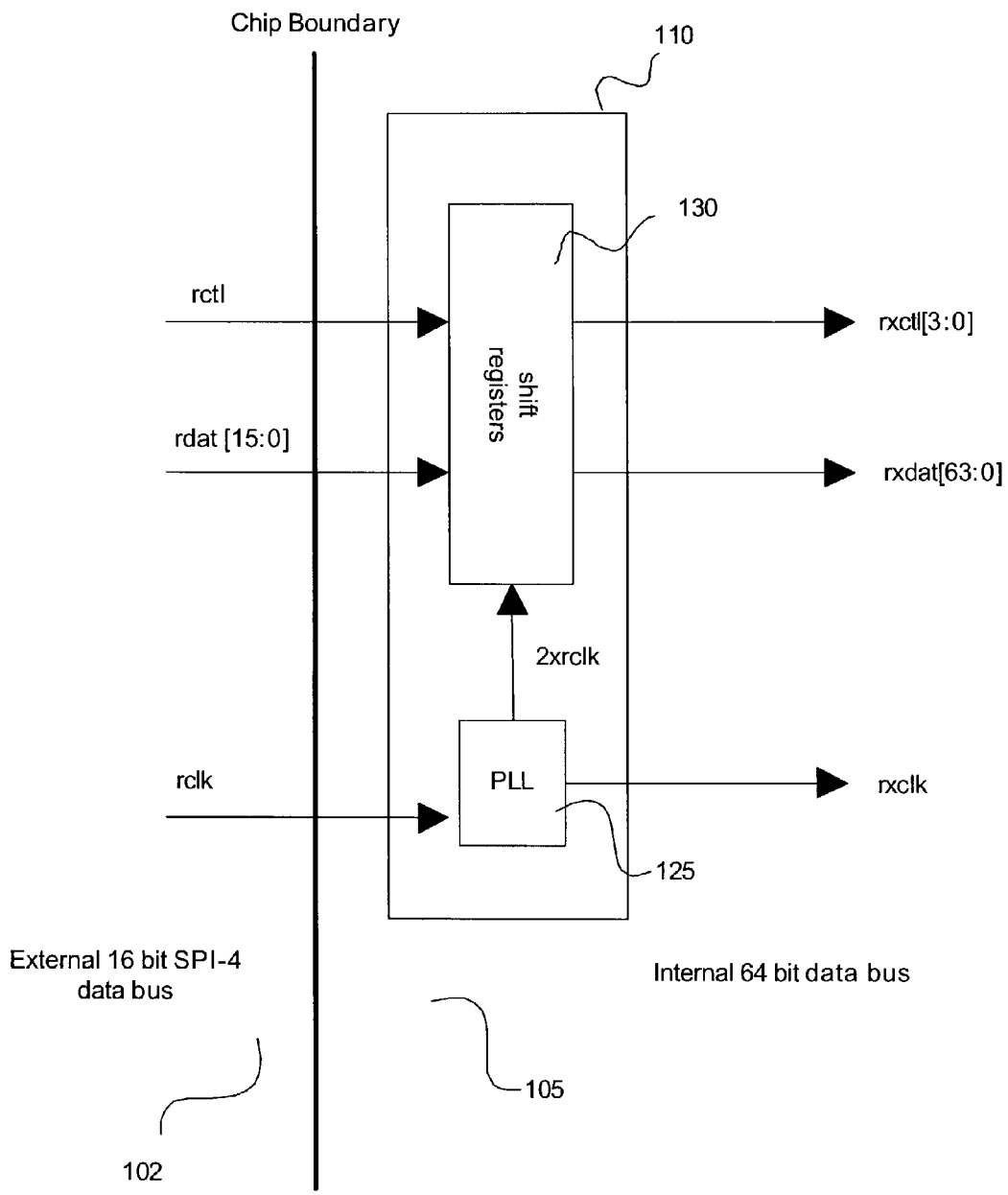
FIG. 2 is a block diagram of a chip boundary according to an embodiment of the invention.

FIG. 2 provides a further detailed illustration of the interface at internal device 105, which may be a chip. Analog circuit 110 may include a phase locked loop (PLL) 125 and shift registers 130. At the chip boundary as shown in FIG. 2, as the data stream arrives, RCLK may be fed into the PLL. RDAT, which includes a 16-bit data signal, and RCTL, which includes a 4-bit control signal, may be transferred into the shift registers 130 of analog circuit 110.

Figure 3A:
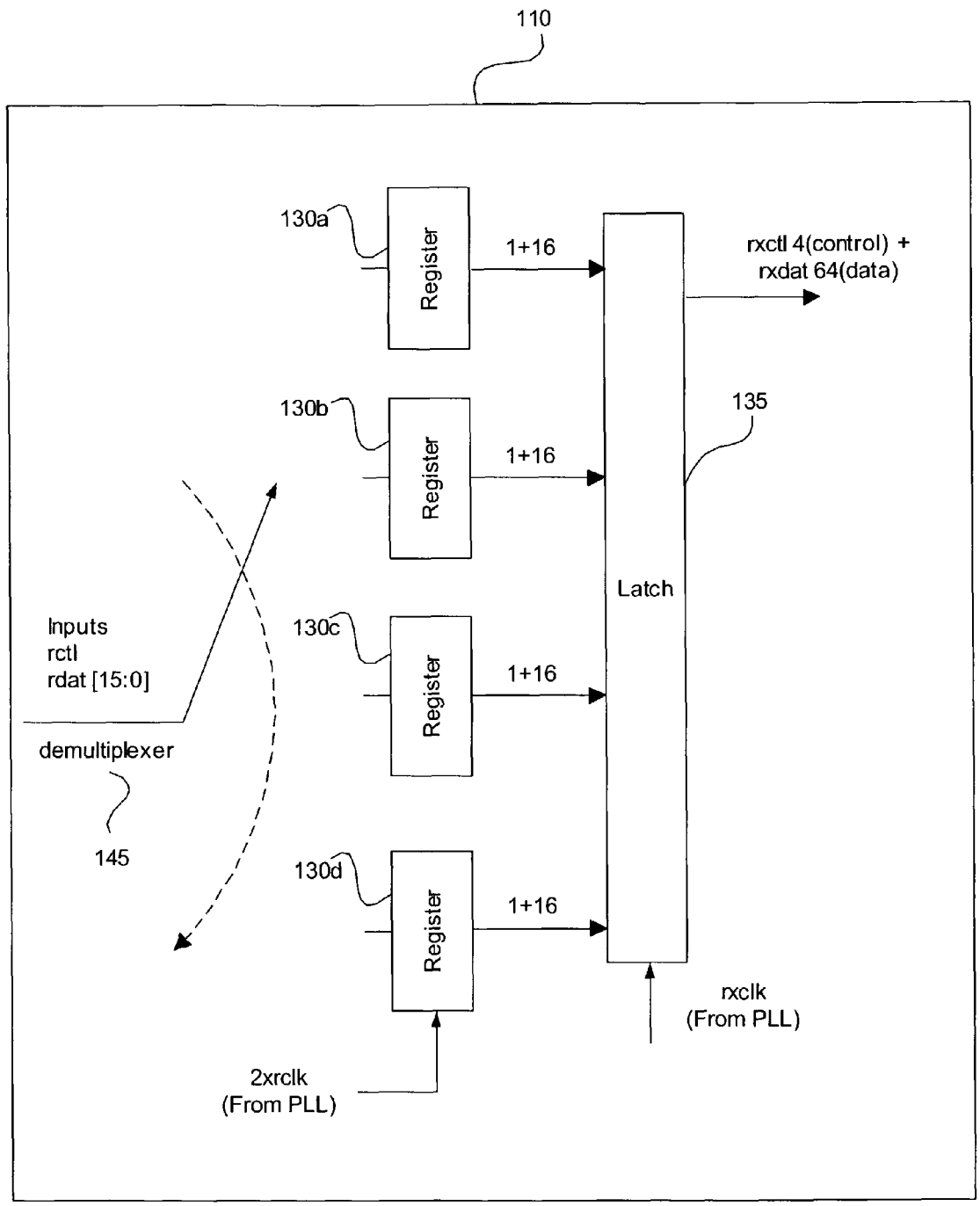
FIGS. 3A-3B illustrate the timing relationship between an internal bus and an external bus according to an embodiment of the invention.
Figure 3B:
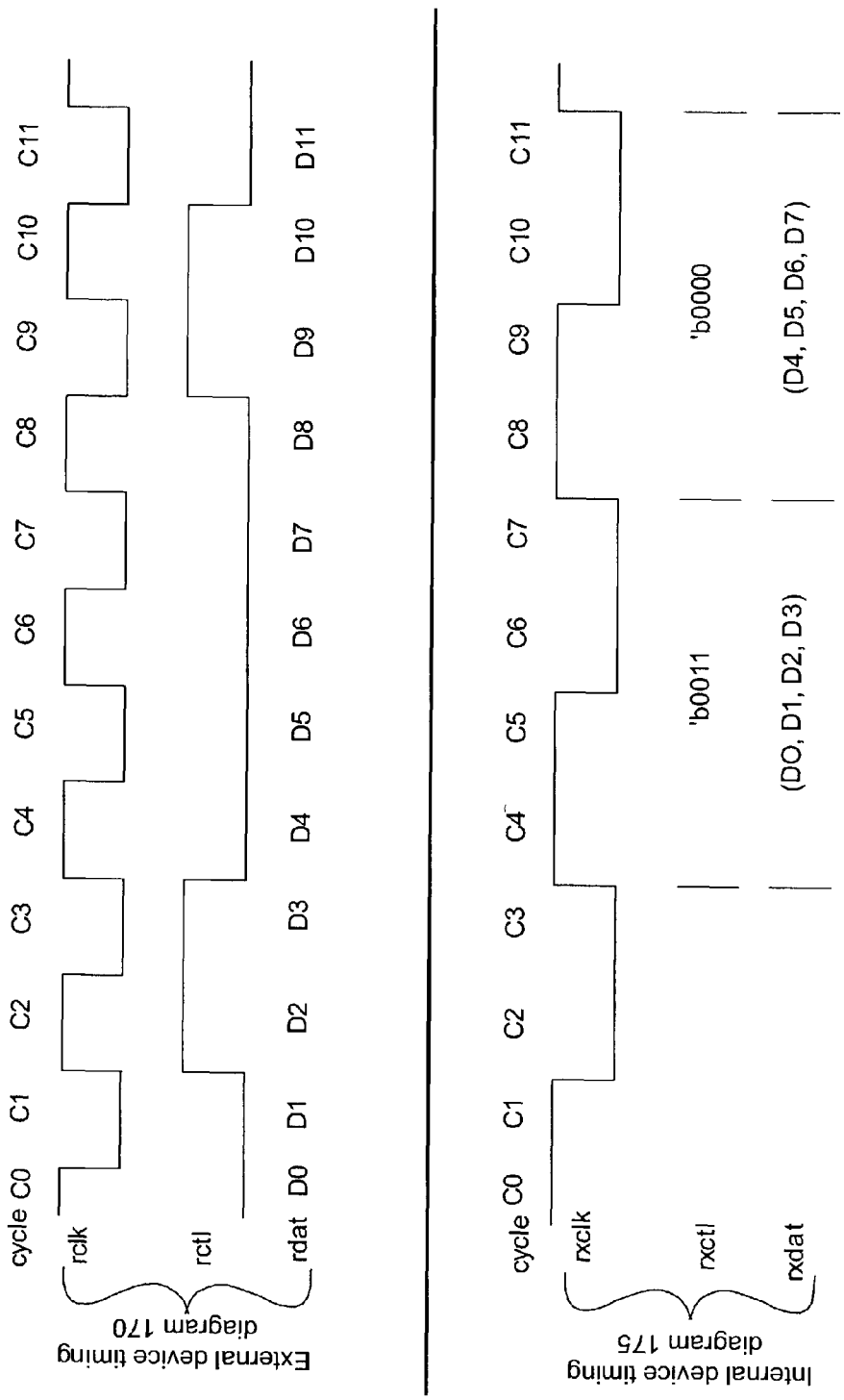

FIGS. 2-3 illustrate how the external 16-bit data bus arrives into chip 110 and may be converted into a 64-bit data bus. PLL 125 or another frequency multiplication circuit may be used to generate the faster frequency clock for the slower system clock of internal device 105. In order for the internal and external devices to synchronously communicate with each other, they need to know the cycle time relationship between their respective clocks and the clocks on the devices with which they are communicating. FIGS. 3A-3B show an example of the timing relationship between the internal and external devices. In FIG. 3A, analog circuit 110 may include a demultiplexer 145, which directs the incoming bits of the data stream from the external device to one of several registers 130a-d. For example, in FIG. 3A demultiplexer 145 directs the incoming data signal and control signals so that 16-bits of a data signal of RDAT and a 1-bit control signal for each clock cycle are directed to a respective shift register 130a-d. PLL 125 may lock onto the external clock signal RCLK and generate a clock signal for shift registers 130a-d and latch 135 which will synchronize the internal and external devices. Shift registers 130a-d may receive an input coupled to their signal line from PLL 125 so that the shift registers 130a-d are clocked by a 2×CLK clock signal transmitted from PLL 125. The 2×CLK clock signal shifts each set of 16-bit data signals and 1-bit control word into and out of shift registers 130a-d. The clock signal 2×CLK transmitted from PLL 125 may be set at at least twice the frequency of the clock, RCLK, of external device 102.

Each set of 17-bits (which includes a 16-bit data signal and 1-bit control signal) from shift registers 130a-d are then transmitted to a latch circuit 135. Another clock signal R×CLK may be transmitted by PLL 125 to latch circuit 135 to achieve synchronization of the external and internal device's clock signals. R×CLK, may be set to be equal to half of the speed of the external clock RCLK. The output of the latch 135 may be a 4-bit control signal and a 64-bit data signal, which are synchronized with the input data from external device 102.

FIG. 3B illustrates a timing diagram of the mapping of the 16-bits of the external device to the 64-bits of the internal device. The external device timing diagram 170 shows the receipt of the 16-bit data at internal device 105. To map the 16-bits to 64-bits, at the beginning of the c4 cycle of the internal device timing diagram 175, the invention may accumulate the data (D0, D1, D2, D3) from the previous four cycles (c0, c1, c2, c3) and output this grouping of data as the 64-bit data signal RXDAT (63:0) from latch 135 for the c4 clock period as shown in FIG. 3A. Similarly, for the c8 cycle in the internal timing diagram 175, the invention may accumulate the data (D4, D5, D6, D7) and output this grouping of 64-bit data as RXDAT for the c8 cycle in the internal device timing diagram 175.

The invention may also map the control signal from external device 102 to internal device 105. The mapping of the control signal, R×CTL, which corresponds to the c4 clock period may be noted by the term 'b0011, which is a syntax for a binary number which includes four data fields. The four data files indicate the position of control signal RCTL during cycles c1, c2, c3 and c4 in the external device timing diagram 170. The data fields of the term 'b0011 is generated by referring to the RCTL reference line of the external device timing diagram 170. As discussed above, in mapping the incoming signals, RCTL may be mapped to a high position when a control word is present, and RCTL may be mapped to a low position otherwise. For example in FIG. 3A, the RCTL for cycle c0 and c1 is "0" as indicated by the low position, and the RCTL for the c2 and c3 cycles are "1" as indicated by the high position. Therefore, the control signal from the external device to internal device maps to a binary number of 'b0011 as shown in the internal diagram timing diagram 175. Therefore, the timing diagram illustrates how the invention may convert the 16-bit data input and the 1-bit control signal into an output of a 64-bit data signal and a 4-bit control signal.

Next, the 4-control signal and the 64-data signal are converted to a digital signal using an analog-to-digital converter (not shown), which may be a component of analog circuit 110. After converting the analog signals to a digital signal the digital signal is applied to input registers 700, as shown in FIG. 1.

Figure 4:
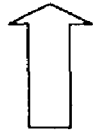
FIG. 4 illustrates channelization according to an embodiment of the invention.

However, converting the 16-bits to 64-bits may create the problem of data misalignment. In the 16-bit data bus domain of external device 102, data misalignment typically is not an issue because the 16-bit data is assigned to only one channel. However, when the 16-bit data is converted into 64-bits in internal device 105, internal device 105 accumulates four groups of 16-bits and combines the four groups into 64-bits, as discussed above. In accumulating the four groups of 16-bits, analog device 110 may select and retrieve one or more groups of data from one of several input channels (not shown) of internal device 105 and interleave the selected groups into a 64-bit grouping. Channelization occurs when data that belongs to different channels are transmitted in an interleaving manner. Channelization may be supported in an embodiment of the invention that employs a SPI-4 interface. The data may be transmitted from multiple channels to port 104 in an interleaving manner. An example of channelization, which is discussed below, is shown in FIG. 4.

At the input channels (not shown) of internal device 105, the invention may be designed to receive several types of input, for example, as shown in TABLE I.

TABLE I

| | |
|---|---|
| CW | control word |
| PLCW | payload control word |
| IC | Idle control word |
| TCW | training control word |
| Data word | control bit is inactivated |
| TDW | training data word |
| Data | payload data |

Figure 5A:
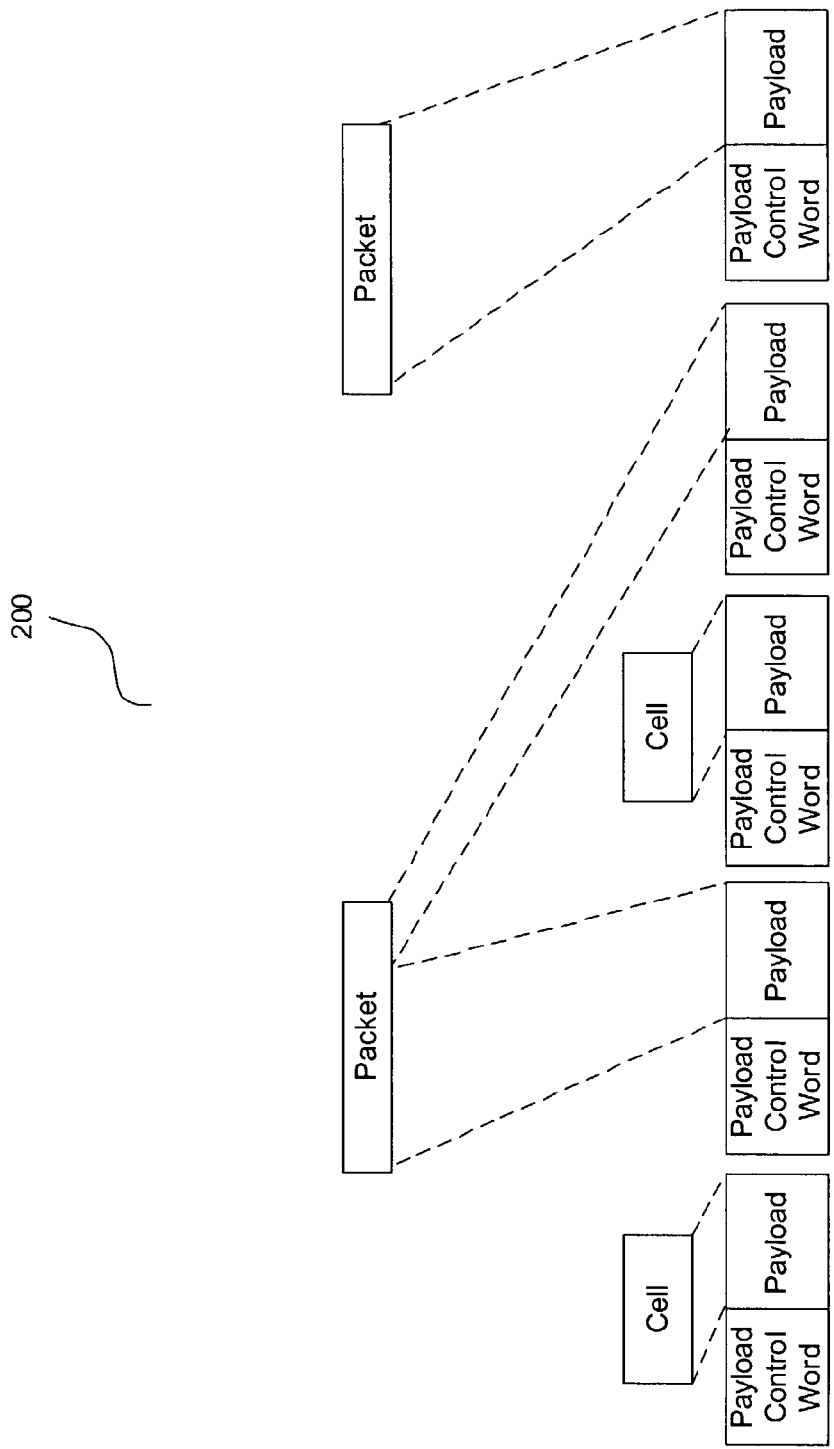
FIGS. 5A-5B illustrate examples of data streams that may be transmitted to a logic device according to the invention.

As shown in FIG. 5A, the binary information may be transferred into internal device 105 as a data stream 200 having minimum and maximum length as determined by a particular application. FIG. 5A provides an illustration of cells and variable-length packets, which can be mapped onto the data stream. Thus, complete packets or shorter data bursts may be transferred in data stream 200.

Control words may be inserted between the data burst transfers. These control words contain the error control coding, also referred to as the parity bits. The parity bits may inform internal device 105 if an error has occurred within the data burst during transmission from the source device to the destination device. Once an error is detected, the destination device may request a retransmission of the corrupted data from the source device.

Figure 5B:
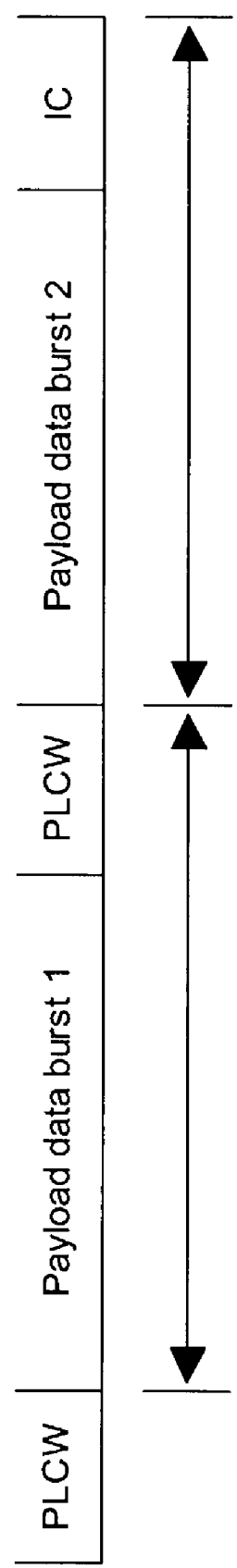

The control word may be an idle control word, payload control and/or training control word. The control words, in FIG. 5A, are shown as payload control words that may separate two adjacent data burst transfers, and the control words may contain the status information pertaining to the previous transfer and the following transfer. Once a transfer has begun, data words may be sent uninterrupted until the end-of-packet (EOP) or a multiple of a predetermined number of 16 bytes is reached. Internal device 105 may be designed so that the maximum configured payload data transfer may be a multiple of 16 bytes. The interval between the end of a given transfer and the next payload control word, which may mark the start of another transfer or start-of-packet (SOP), may consist of zero or idle control words and/or training patterns. Namely, the gap between shorter packets may be filled with idle control words. As shown in FIG. 5B, the control word may be appended to the end of a data burst. If the information is being transmitted in as packets, each packet may be divided into multiples of 16 bytes, with the exception of the end-of-the packet. The end-of-the packet may be of any length, as shown in FIG. 5B. Thus, the end-of-the packet may be a variable length packet.

FIG. 6A describes some of the fields that may be included in the control word. FIG. 6B shows a list of sample control word types. FIG. 6C shows examples of valid control words.

As discussed above, data misalignment may occur in an electronic device due to channelization. In FIG. 4, clock cycles c1, c2, c3, c4, c5, c6, c7, c8 and c9 are shown. Analog device 110 may select the input of the incoming data stream from the input channels (not shown) so that the input may be arranged in the pipeline as shown in FIG. 4. In mapping the data input as shown in FIG. 4, the term "dij" may be used, where the symbol "d" represents a "data" input, the symbol "i" represents the channel number and the symbol "j" represents the "jth" 16-bit data belonging to channel "i." For example, "d15" in the column of cycle c2 may be read as the $5^{th}$ data bit transmitted from channel 1. Accordingly, in the columns of cycles c1 and c3 of the example shown in FIG. 4, a payload control word PC and channel 1 data are being transmitted. In cycle c2, only channel 1 data is being transmitted. In cycle c4, only channel 2 data is being transmitted. In cycle c5, channel 1 data (d1a), channel 2 data (d24) and two payload control words (PC) are being transmitted. In cycle c5, this is the end of the packet for channel 1 data, and channel 2 data begins to be transmitted. In cycle c6, channel 2 data, an idle control word (IC) and a payload control word (PC) are being transmitted. In cycle c6, this is the end of the packet for channel 2 data, and channel 3 data begins in cycle c7. In cycles c7 and c8, only channel 3 data is being transmitted. In cycle c9, only idle control words (IC) are being transmitted.

In cycle c5, where data that belongs to both channel 1 and channel 2 is being transmitted, there is a chance that data misalignment may occur due to the fact that cycle c5 includes the end of the packet for channel 1, which may be a variable-length packet, and the end of the packet for channel 1 is followed by a payload control word PC. Due to the data misalignment, which may be caused by the variable-length packets, a problem may also arise which causes the loss of bandwidth.

Figure 7:
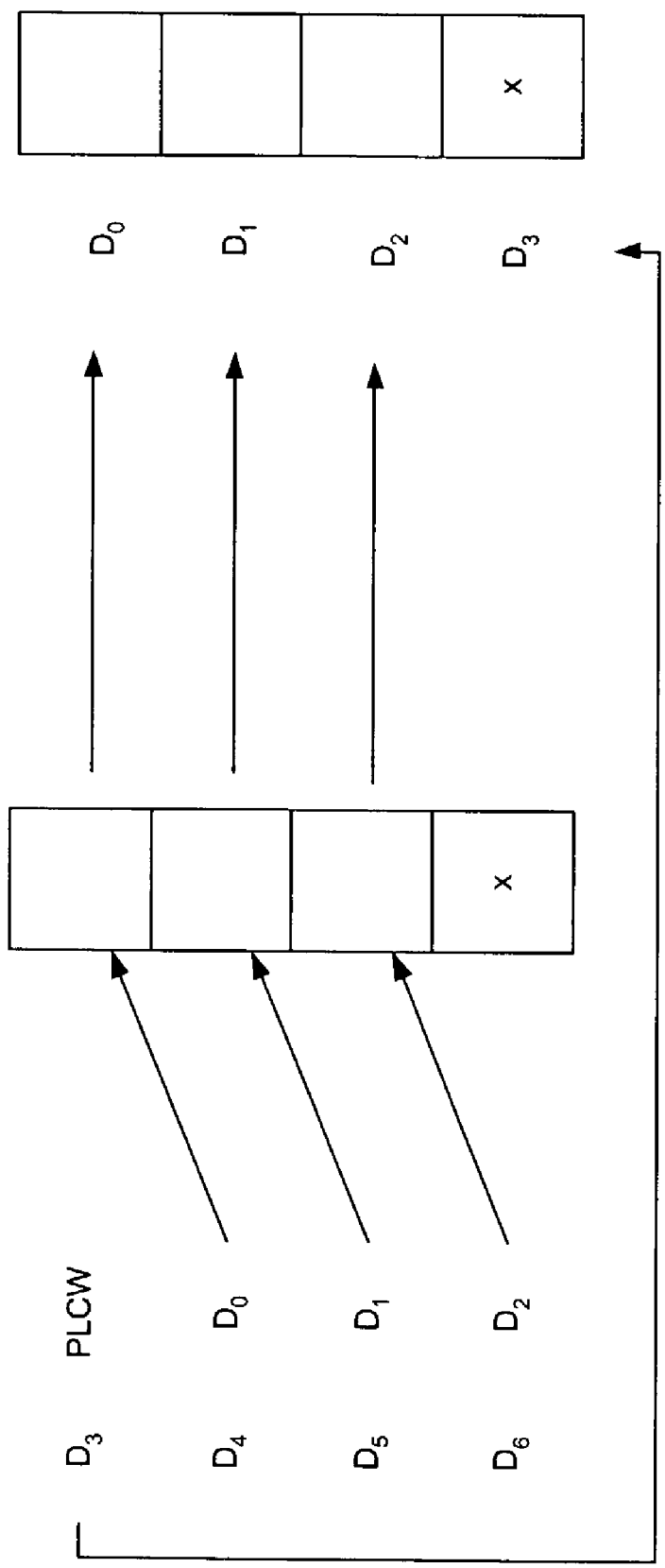
FIG. 7 depicts an incoming transmission of a variable length packet being transmitted along an outgoing pipeline according to an embodiment of the invention.

When an end-of-the packet or a variable length packet arrives within a network device that does not comply with the predetermined data burst size, the system may lose bandwidth with each non-confirming transmission. For example, FIG. 7 shows an incoming data burst including three blocks of data, D0, D1, and D2. Each block of data may be a 16-bit data block. The PLCW, which follows the transmission of packets D0, D1, and D2 shown in FIG. 7, may serve to indicate the beginning of the next data burst transmission. Thus, in FIG. 7, as the data travels thru the pipeline, one slot, which is represented by "X", remains empty. If the data burst of D0, D1, and D2 are transmitted through the pipeline and out of the system while including the empty slot "X", this contributes to bandwidth loss since such a transmission does not utilize all of the available bandwidth.

In order to mitigate bandwidth loss, a conventional device may be configured to wait for the next data transmission to arrive so that the next arriving bit, D3, may be used to fill in the empty slot "X" before the system transfers packets D0, D1, and D2 out of the system. However, waiting for the arrival of the next data burst may create a delay in the transmission of the packets from a conventional device.

The invention provides a method for utilizing a tail bus to compensate for the bandwidth loss due to data burst, which fails to satisfy a predetermined data burst size. The invention also provides a method and apparatus to compensate for channelization within a network device. Instead of delaying the transmission of the variable length packet, the invention may calculate the number of bytes that are needed on a main bus and a tail bus in order to transmit the variable length packet out of the system. The tail bus may function as an additional bus used in conjunction with the transmission of the main bus to output the bytes contained within the variable length packet.

The invention may perform both a tail bus and a main bus calculation because the invention is capable of transmitting data from multiple channels due to channelization as discussed above. The main bus may be configured to carry only data from the same channel. However, the tail bus may be utilized to carry data of a different channel. Therefore, the invention may use the tail bus when due to channelization there is a need to transmit data from a different channel out of the system simultaneously with the data transmitted on the main bus. For example, main bus can transport data of channel 1 whereas the data of channel 8 may be transported on the tail bus. Thus, when a variable length packet is received at internal device 105, the invention may perform a tail bus calculation to determine how many bytes, if any, may be needed, within the tail bus. According to another embodiment of the invention, if data is being transmitted on only one channel, the main bus and the tail bus may be used to send out data that belongs to the same channel.

Thus, when a variable length packet is received at internal device 105, the invention may determine the number of bytes that are needed to be transmitted out along the main bus and the tail bus in order to compensate for the bandwidth loss and to avoid a transmission delay. To determine the number of bytes needed within the tail bus and the main bus, the invention may perform a byte-by-byte inspection to determine the pattern of the incoming data stream. The invention may configure a pattern detection scheme to detect the arrival of certain parameters within the system in order to determine the pattern or the composition of the data stream. For instance, the invention may detect information within the data stream such as the position of the first control word in the current 64-bit input and the position of the last PLCW. Since the PLCW and the control words may be inserted between data burst transfers, the invention may detect the position of the last PLCW and the first control word to determine the number of bytes needed within the tail bus to send the variable length packet out of the system.

In determining when a tail bus is needed and in calculating the number of bytes needed within the tail bus, the invention may initially calculate the number of bytes that are needed as an output of a main bus. Although the tail bus may be used as a separate bus in addition to the main bus, in transferring the variable packet out of the system, the tail bus may be designed to run at the speed of the main bus.

TABLES II-IX may be used to illustrate a pattern detection scheme that may be used according to one embodiment of the invention. In order to facilitate the inspection of the data stream, the incoming data stream may be transmitted through a decoder 710 so that the bits of the data stream are divided into groupings, as shown in TABLE II below. For example, the decoder 710 may divide a 64-bit bus into four groups. Each of the four groups may include a 16-bit block of data.

TABLE II

| | |
|---|---|
| G0 = | (Input0, input1, . . . , input14, input15) |
| G1 = | (Input16, input17, . . . , input30, input31) |
| G2 = | (Input32, input33, . . . , input46, input47) |
| G3 = | (Input48, input49, . . . , input62, input63) |

As the bits within the data stream are received at internal device 105, decoder 710 may inspect the data stream to monitor parameters such as the position of the last PLCW and the first control word. The invention may be configured, according to one embodiment, so that a memory database is not included within internal device 105. In such an embodiment, a state machine or a d-flop device (both not shown) may be used to indicate the state of the variables, such as the PLCW and control words, that are being monitored by decoder 710.

Figure 8:
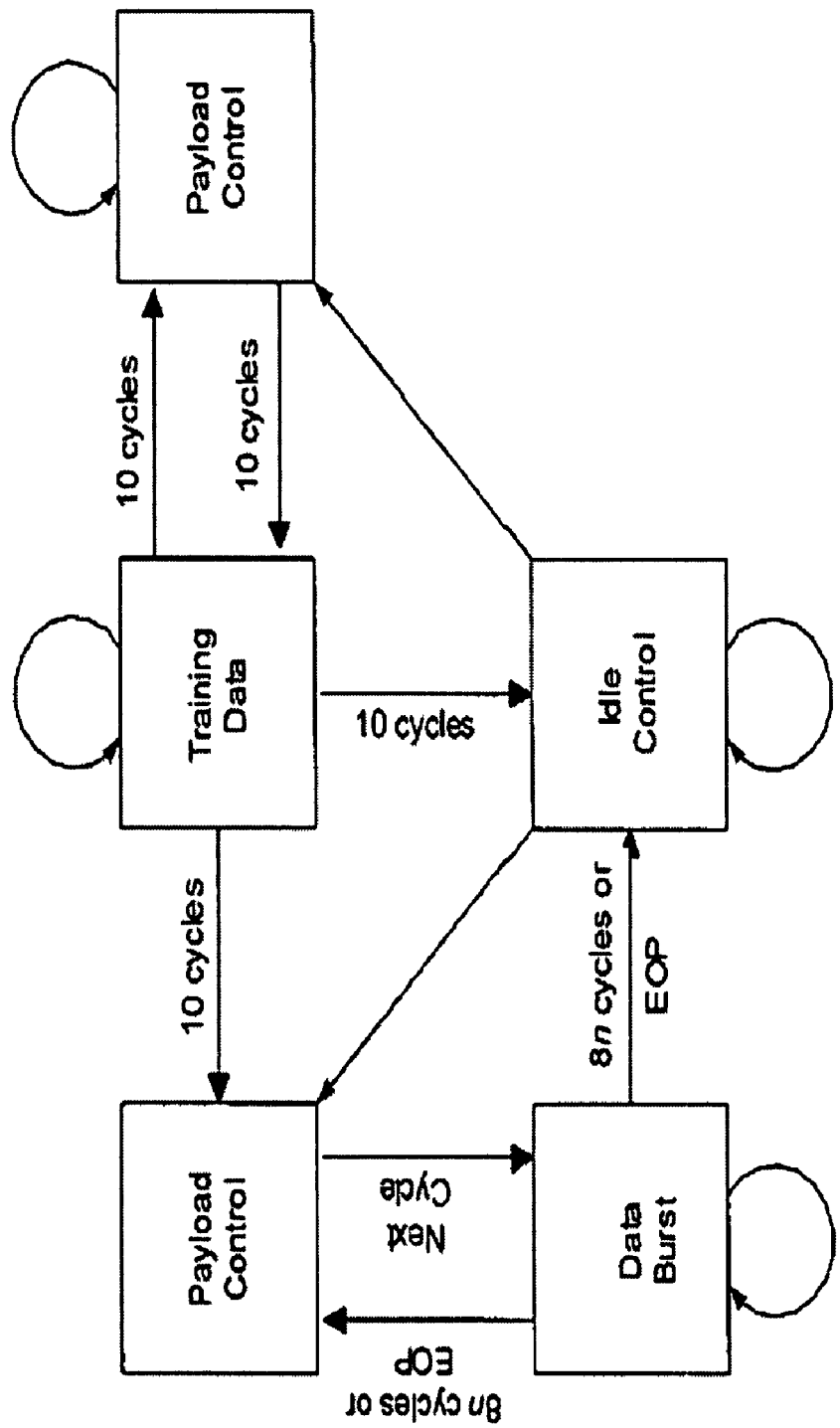
FIG. 8 is a state diagram that may be employed according to an embodiment of the invention.

Based upon the pattern of the data stream, the invention may determine whether a PLCW has yet been received into the system. The system may be configured to initially detect whether a PLCW has yet been received into the system because the invention may be configured to operate according to state diagram, shown in FIG. 8. According to the state diagram, a data burst transmission must follow after a PLCW transmission. Thus, the invention may be configured to initially detect a PLCW in order to determine whether the data burst transmission has begun. If no PLCW has been received within the data stream, decoder 710 also notes that no data has been received. The decoder 710 may also be used to also detect the position of the first control word in the current 64-bit input.

Based upon the pattern of the data stream, the invention may generate a look-up table as shown in TABLE III, to determine the number of bytes needed within the main bus output and the tail bus output. The decoder 710 may flag a specific bit to indicate whether a PLCW exists within the data stream. For instance, the second bit, bit(2), may be flagged to indicate the position of the last PLCW. As shown in TABLE IV, the bit(2) may be used to indicate whether the last PLCW has been received into the system and bit(1:0) may be used to indicate the position of the PLCW. Bit(1:0) may be used to indicate that the PLCW was detected in the grouping of G0, G1, G2, or G3. For example, if decoder 710 detects the PLCW within group G1, the corresponding binary code "01" for bit(1:0) may be inserted into the state machine (not shown).

TABLE III

| CPOS(2:0) | | |
|---|---|---|
| Bit(2) = | 0 | no PLCW |
| Bit(2) = | 1 | PLCW received |
| Bit(1:0) = | 00 | PLCW at G0 |
| Bit(1:0) = | 01 | PLCW at G1 |
| Bit(1:0) = | 10 | PLCW at G2 |
| Bit(1:0) = | 11 | PLCW at G3 |

Similarly, the invention may generate another look-up table, as shown in TABLE IV, to indicate the position of the first control word in the current 64-bit input.

TABLE IV

| FCW(2:0) | | | |
|---|---|---|---|
| Bit(2) = | 0 | = | no control word |
| Bit(2) = | 1 | = | there is a control word |
| Bit(1:0) = | 00 | : | at G0 |
| Bit(1:0) = | 01 | : | at G1 |
| Bit(1:0) = | 10 | : | at G2 |
| Bit(1:0) = | 11 | : | at G3 |

The term "CPOS" may represent the position of the last PLCW detected in TABLE III, and the term "FCW" may represent the position of first control word in the current 64-bit input detected in TABLE IV. The FCW may be configured to relate only to the current 64-bits. In the 64-bits, there may be at least one or more control words. For example, the 64-bits may include one, two, three or four control words. However, the system may be configured to only detect the position of the first control word within the 64-bits. When the next 64-bits arrive, the system may reset the flags or state of the state machine.

Based upon the CPOS and FCW generated using TABLES III and IV, the invention may generate look-up TABLES V-IX to determine how many bytes are needed in the main bus and the tail bus. As shown in FIG. 1, decoder 710 may transfer its output signals to a data alignment circuit 120 for further processing. Decoder 710 may transfer signals such as the RXDAT, RXCTL, RXCLK, CPOS, MDEC, TDEC, and FCW signals to data alignment circuit 120. After processing these signals, data alignment circuit 120 may output the number of bytes needed in the main bus and the tail data bus to other components within the network device. Data alignment circuit 120 may output signals on the main bus such as a main bus data (MDAT) signal, a main bus channel identification (MCHID) signal, a main bus byte count (MBCNT) signal, a main bus start of packet (MSOP) signal, a main bus end of packet (MEOP) signal, and a main bus error (MERR) signal. Signals that may be transmitted along the tail bus may include, for example, a tail bus data (TDAT) signal, a tail bus channel identification (TCHID) signal, a tail bus byte count (TBCNT) signal, a tail bus end of packet (TEOP) signal, and a tail bus error (TERR) signal.

How the system may use TABLES V-IX will be explained in this discussion by way of example.

In EXAMPLE 1, the decoder 710 has detected the following parameters for CPOS and FCW:

CPOS(2:0)=101

FCW=111

Data pattern=(DB, DB, DB, CW)

Initially, when a variable packet arrives at internal device 105, the system may use CPOS to determine the position of the last PLCW. In EXAMPLE 1, the first two bits from right to left of CPOS are "01." When the bits "01" are converted to a binary number, this equals "1". According to TABLE V, bit(2)=1 means that a PLCW has been received into the system. Next, the system may use FCW to determine whether the system has received any control words, and, if so, the system may determine the position of the first control word. According to this example, where FCW=111, the last two bits "11" represents a "3" as a binary number.

Now, the system may use CPOS and FCW to calculate the main bus. The system may search TABLE VI and determine the point of intersection for CPOS=1 and FCW=3. In this example, the point of intersection equals "M8" which indicates that 8 bytes are need on the main bus.

TABLE V (MAIN BUS OUTPUT)

| CPOS↓\FCW→ | 0 | 1 | 2 | 3 | NO CONTROL WORD |
|---|---|---|---|---|---|
| 0 | M6 | M8 | M8 | M8 | M8 |
| 1 | M4 | M6 | M8 | M8 | M8 |
| 2 | M2 | M4 | M6 | M8 | M8 |
| 3 | — | M2 | M4 | M6 | M8 |
| No PLCW | Special case | | | | |

Therefore, in TABLE V, the invention may search under the CPOS column for "1. " The CPOS-axis may be set as the far left-hand column of TABLE V, and the top row of TABLE V may be used to determine the point of intersection along the FCW-axis. Therefore, the point of intersection is M8 for the main bus.

To determine the tail bus, the invention may generate another look-up table, such as TABLE VII. For EXAMPLE 1, decoder 710 may detect the data pattern "DB, DB, DB CW", as outlined above. Based upon the data pattern of the current input, the invention may convert the data pattern to represent a numerical value which may be represented, in this example, as "tdec=1101" as shown in TABLE VI. In TABLE VI, the symbol "?" indicates that any type of 16-bit block data that may be located within his position.

TABLE VI

| TDEC(3:0) = | 1000 (PLCW, DB, CW, ?) |
|---|---|
| = | 1001 (PLCW, DB, DB, CW) |
| = | 1011 (?, PLCW, DB, CW) |
| = | 1100 (DB, DB, CW, ?) |
| = | 1101 (DB, DB, DB, CW) |

The numerical value generated based on the data pattern in TABLE VI may be used in TABLE VII to determine the number of bytes needed in the tail bus. In TABLE VII, when the numerical value equals "1101" and the first two bits for CPOS(1:0) equals "01", the tail bus is determined to be "T2." "T2" means that 2 bytes are needed in the tail bus.

TABLE VII (TAIL BUS OUTPUT)

| TDEC(3:0) | |
|---|---|
| if CPOS(2) = 0 | T0 |
| Else | |
| 1000 | T2 |
| 1001 | T4 |
| 1011 | T2 |
| 1100 | CPOS(1:0) = 00 |
| | if true → T2 |
| | if not → T0 |
| 1101 | case(CPOS(1:0)) |
| | 00: T4 |
| | 01: T2 |
| | 1x: T0 |
| All others | T0 |

Thus, in EXAMPLE 1, the invention determines that 8 bytes are needed on the main bus and 2 bytes are needed on the tail bus to transfer the variable length packet out of the system.

In EXAMPLE 2, decoder 710 may detect the initial parameters of the data stream as:

CPOS(2:0)=110

FCW=101

Data pattern =(DB, PLCW, DB, DB)

The system may use a similar method to search TABLES II-VII, as discussed with regard to EXAMPLE 1, to determine that CPOS =2 as a binary number and FCW=1 as a binary number. Therefore, the point of intersection for CPOS=2 and FCW=1 in TABLE V is "M4", which means that 4 bytes are needed on the main bus. The system may use TABLE VI to determine that based upon the data pattern of "DB, PLCW, DB, DB" the numerical value equals for TDEC equals "0000." The system may set the numerical value for TDEC to equal "0000" because the data pattern does not fall within any of the pre-defined data patterns shown in TABLE VII.

Next, based upon TDEC(3:0) determined in TABLE VI, the system may use TABLE VII to determine the tail bus needed for the current data stream. In this example, since the numerical value "0000" also does not match one of the pre-defined numerical values in TABLE VII, the system may determine that no data is needed on the tail bus. Therefore, the system may determine for EXAMPLE 2 that the main bus needs 4 bytes and that no data is added on the tail bus.

The invention may also be configured to detect the number of bytes needed on the main bus and the tail bus when the bit(2)=0 for the CPOS, which means that no PLCW has arrived in the system. The system may treat this situation as a special case. The invention may also generate a look-up table to determine the number of bytes that are needed even when no PLCW has yet been detected in the system. The invention may generate a data pattern having, for example, three different configurations, as shown in TABLE VIII.

TABLE VIII

| MDEC(2:0) = | 100 (PLCW, DB, CW, ?) |
|---|---|
| | 110 (PLCW, DB, DB, CW) |
| | 111 (?, PLCW, DB, CW) |

The MDEC(2:0) determined in TABLE VIII may be converted to a binary number and based upon the binary number for MDEC(2:0), the system may use TABLE IX to determine the number of bytes needed for the tail bus when no PLCW has transmitted into the system. The tail bus may be determined using TABLE VII.

TABLE IX (MAIN BUS SPECIAL CASE OUTPUT)

| MDEC(2:0) | |
|---|---|
| 0–3 | M0 |
| 4 | M2 |
| 5 | M0 |
| 6 | M4 |
| 7 | M2 |

Thus, the system may also provide an apparatus and method of determining the output of the main bus and the tail bus even if the system detects that a PLCW has not yet been received by the system.

In general, the invention provides a method and apparatus for utilizing a tail to solve back-to-back data burst problems. For instance, if the system detects that a variable length packet has arrived within the system, the decoder will detect the pattern of the incoming data stream. Based upon the patterns, the invention may perform a byte inspection to determine the bytes needed on the main bus and the tail bus to transmit the data out of the system. If the data stream includes channelization, i.e., data from a different channel, the tail bus may be used to simultaneously data burst the data from the channel, while the main bus is used to transfer the data from a different channel.

One having ordinary skill in the art will readily understand that the steps of the method may be performed in different order, or with multiple steps in parallel with one another. Also, one having ordinary skill in the art will understand that a network device may be configured to perform the above-described method either in silicon or in software. Accordingly, one will understand that the switching configurations described herein are merely exemplary. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A network device comprising:
   a port configured to receive a data burst;
   a bus transmission calculation module configured to inspect said data burst and, based upon a pattern of data blocks and one or more control words in said data burst, calculate a first number of bytes of said data burst to be transmitted from a first bus and a second number of bytes of said data burst to be transmitted from a second bus, wherein said first bus and said second bus connect to and transfer data from said network device.

2. The network device as recited in claim 1, wherein said bus transmission calculation module calculates said first number of bytes to transmit data associated with a first channel from said network device and calculates said second number of bytes to transmit data associated with a second channel from said network device.

3. The network device as recited in claim 2, wherein said bus transmission calculation module calculates said first number of bytes and said second number of bytes by performing a byte-by-byte inspection of said data burst when a data burst size of said data burst fails to meet a predetermined data burst size.

4. The network device as recited in claim 3, wherein said bus transmission calculation module calculates said first number of bytes and said second number of bytes by detecting a position of a last payload control word transmitted within said data burst.

5. The network device as recited in claim 4, wherein said bus transmission calculation module calculates said first number of bytes and said second number of bytes by detecting a position of a first control word transmitted within said data burst.

6. A method of data transmission comprising:
   receiving a data burst at a port connected to a network device;
   inspecting said data burst;
   calculating a first number of bytes of said data burst to be transmitted from a first bus connected to said network device based upon a pattern of data blocks and one or more control words in said data burst; and
   calculating a second number of bytes of said data burst to be transmitted from a second bus connected to said network device based upon said pattern of data blocks and said one or more control words in said data burst.

7. The method as recited in claim 6, wherein calculating said first number of bytes further includes calculating a first number of bytes associated with a first channel from said network device.

8. The method as recited in claim 7, wherein calculating said second number of bytes further includes the step of calculating a second number of bytes associated with a second channel from said network device.

9. The method as recited in claim 8, further comprising:
   performing a byte-by-byte inspection of said data burst when a burst size of said data burst fails to meet a predetermined burst size.

10. The method as recited in claim 9, further comprising:
    detecting a position of a last payload control word transmitted within said burst.

11. The method as recited in claim 10, further comprising:
    detecting a position of a first control word transmitted within said data burst.

12. A network device comprising:
    a receiving means for receiving a data burst; and
    a bus transmission calculation means connected to said receiving means for inspecting said data burst and, based upon a pattern of data blocks and at least one control word of said data burst, calculating a first number of bytes of said data burst to be transmitted from a first bus and a second number of bytes of said data burst to be transmitted from a second bus, wherein said first and second bus connect to and transfer data from said network device.

13. The network device as recited in claim 12, wherein said bus transmission calculation means calculates said first number of bytes to transmit data associated with a first channel from said network device and calculates said second number of bytes to transmit data associated with a second channel from said network device.

14. The network device as recited in claim 13, wherein said bus transmission calculation means calculates said first number of bytes and said second number of bytes by performing a byte-by-byte inspection of said data burst when a burst size of said burst fails to meet a pre-determined burst size.

15. The network device as recited in claim 14, wherein said bus transmission calculation means calculates said first number of bytes and said second number of bytes by detecting a position of a last payload control word transmitted within said data burst.

16. The network device as recited in claim 15, wherein said bus transmission calculation means calculates said first number of bytes and said second number of bytes by detecting a position of a first control word transmitted within said data burst.

17. The network device as recited in claim 3, wherein said data burst comprises a variable length packet.

18. The network device as recited in claim 1, wherein the one or more control words include error control coding.

19. The method as recited in claim 6, wherein the one or more control words include error control coding.

20. The method as recited in claim 6, further comprising:
after the calculating a first number of bytes, transmitting the first number of bytes of said data burst from the first bus to said network device.

21. The network device as recited in claim 12, wherein the one or more control words include error control coding.

* * * * *